(12) United States Patent
Dargavell et al.

(10) Patent No.: US 7,699,338 B2
(45) Date of Patent: Apr. 20, 2010

(54) REMOVABLE AIRBAG HOOK BRACKET FOR SERVICEABILITY

(75) Inventors: Andrew L. Dargavell, Oxford, MI (US); Walter R. Woodward, Chesterfield, MI (US)

(73) Assignee: Intertec Systems, Plymouth, MI (US)

( * ) Notice: Subject to any disclaimer, the term of this patent is extended or adjusted under 35 U.S.C. 154(b) by 48 days.

(21) Appl. No.: 11/762,983

(22) Filed: Jun. 14, 2007
(Under 37 CFR 1.47)

(65) Prior Publication Data

US 2008/0023944 A1 Jan. 31, 2008

Related U.S. Application Data

(60) Provisional application No. 60/813,703, filed on Jun. 15, 2006.

(51) Int. Cl.
*B60R 21/20* (2006.01)
(52) U.S. Cl. .................... 280/728.2; 280/732
(58) Field of Classification Search .............. 280/728.2, 280/728.3, 732
See application file for complete search history.

(56) References Cited

U.S. PATENT DOCUMENTS

| | | | | | |
|---|---|---|---|---|---|
| 5,398,960 | A | * | 3/1995 | Ravenberg et al. | 280/728.3 |
| 5,439,246 | A | * | 8/1995 | Ravenberg et al. | 280/728.3 |
| 6,161,862 | A | * | 12/2000 | Rose et al. | 280/728.2 |
| 6,502,851 | B2 | * | 1/2003 | Kitagawa | 280/728.2 |
| 7,048,297 | B2 | * | 5/2006 | Schneider | 280/728.2 |
| 7,052,036 | B2 | * | 5/2006 | Lee et al. | 280/728.3 |
| 2004/0046371 | A1 | * | 3/2004 | Lee et al. | 280/732 |
| 2004/0169355 | A1 | * | 9/2004 | Helmstetter et al. | 280/728.2 |

* cited by examiner

*Primary Examiner*—Paul N Dickson
*Assistant Examiner*—Drew Brown
(74) *Attorney, Agent, or Firm*—Dykema Gossett PLLC

(57) ABSTRACT

A passenger airbag module removably connectable to an automotive interior component. The passenger airbag module may include a front bracket engageable with an automotive interior component and a rear connector having a detent or an aperture. A rear bracket may be removably connectable with the rear connector by an aperture or detent for respectively receiving or insertion into the detent or aperture of the rear connector. The rear bracket may be further configured to engage the automotive interior component.

12 Claims, 6 Drawing Sheets

REMOVABLE AIRBAG HOOK BRACKET FOR SERVICEABILITY

RELATED APPLICATIONS

This application claims benefit of priority of Provisional Application Ser. No. 60/813,703 filed Jun. 15, 2006, hereby incorporated by reference in its entirety.

BACKGROUND OF INVENTION a. Field of Invention

The invention relates generally to the manufacture and assembly of automotive components, and more particularly to an improved method and system of attaching a passenger-side airbag (PAB) module.

b. Description of Related Art

Automobiles are commonly equipped with airbags for reducing driver and passenger injuries in the case of an accident. Automobile airbags are generally located in areas where a driver or passenger would potentially contact an automobile interior in the event of an accident. Airbags can reduce injuries by providing a substantially non-solid surface for the driver or passenger to contact, as opposed to the generally solid surfaces of the automotive interior. Airbags are generally activated by a sensor system, which is triggered by the onset of an automobile accident, and causes an airbag to release and inflate. As such, the proper installation and maintenance of airbag systems within an automobile is required for enhancing the safety of drivers and passengers.

In order to install an airbag, the airbag is generally folded into a module that is installed into or behind an automotive interior component. The module housing a passenger-side airbag (PAB) is generally installed on the underside of an instrument panel, which typically consists of a panel with a chute protruding behind it. The PAB module can be secured to the instrument panel by means of brackets and the like, which may be integral with or welded to the PAB module, and thereafter engaged to the instrument panel chute.

In order to repair or replace a PAB module, a PAB module must be detached from the instrument panel, and once repaired or replaced, a PAB module is reattached to the instrument panel. The attaching and detaching of PAB modules subjects the instrument panel to repeated stress and increases the risks of PAB malfunction and/or instrument panel disfiguration. Namely, in order to access the PAB module, in certain cases, the top chute of the instrument panel must first be expanded (i.e. by a prying device), allowing the hook brackets to clear and be removed. Alternatively, if needed, the instrument panel may be removed for accessing the PAB module.

Such an exemplary system for attaching a PAB module is disclosed in U.S. Pat. No. 6,161,862 to Rose.

Referring to FIGS. 6 and 7 of Rose, there is discloses a reaction canister body (632) including side walls (640, 642). As shown in FIG. 6, wall (640) includes cylindrical bead (699) slidably insertable into pivot channel (698). Referring to FIGS. 1 and 2, in a similar manner as the embodiment of module assembly (10) not including removable wall (640), tabs (88) may be inserted into complementary slots in module cover (20). In order to detach and service canister body (632) from cover (20), tabs (88) would first need to be removed from the complementary slots in module cover (20), and thereafter, the entire canister body (632) including walls (640, 642) would need to be removed for access to inflator (14) or airbag (16).

Such requirements for removal of canister body (632) (or (32) of FIG. 1) are relatively complex because of the tight spaces associated with such components. The end result, as discussed above, may damage the instrument panel or require removal thereof for access to the canister body.

It would therefore be of benefit to provide an economical and efficient method and system for attaching and detaching a PAB module, and for facilitating repair or replacement of the PAB module without causing damage to automotive interior components. It would also be of benefit to provide a method and system for attaching and detaching a PAB module that requires a minimal number of steps.

SUMMARY OF THE INVENTION

The present invention overcomes the drawbacks and deficiencies of the aforementioned passenger-side airbag (PAB) module connection techniques by providing a passenger airbag module removably connectable to an automotive interior component. The passenger airbag module may include a front bracket engageable with an automotive interior component and a rear connector having one or more detents or apertures. A rear bracket may be removably connectable with the rear connector by an aperture or detent for respectively receiving or insertion into the detent or aperture of the rear connector. The rear bracket may be further configured to engage the automotive interior component.

For the passenger airbag module described above, the rear bracket may include one or more hooks configured to engage the automotive interior component. In a particular embodiment, the automotive interior component may be an airbag chute engaged with an instrument panel, and the hook may be configured for insertion into a complementary opening in the airbag chute. The passenger airbag module may further include a fastener connectable to the detent and configured to secure the rear bracket to the passenger airbag module. The passenger airbag module may also include a connector engageable with the detent for securing the rear bracket to the passenger airbag module. The front bracket may include one or more hooks for engaging the automotive interior component.

The invention also provides a passenger airbag module removably connectable to an automotive instrument panel. The passenger airbag module may include a first bracket engageable with an airbag chute connectable to the automotive instrument panel, and a connector having a detent or an aperture and disposed at a generally opposite side of the passenger airbag module as the first bracket. A second bracket may be removably connectable with the connector by an aperture or detent for respectively receiving or insertion into the detent or aperture of the connector, with the second bracket being further configured to engage the airbag chute.

For the passenger airbag module described above, the second bracket may include one or more hooks configured to engage the airbag chute. The hook(s) may be configured for insertion into a complementary opening in the airbag chute. The passenger airbag module may further include a fastener connectable to the detent and configured to secure the second bracket to the passenger airbag module. The passenger airbag module may further include a connector engageable with the detent for securing the second bracket to the passenger airbag module. The first bracket may include one or more hooks for engaging the airbag chute.

The invention also provides a method for attaching or detaching a passenger airbag module from an automotive interior component. The method may include providing an instrument panel having an instrument panel chute, with the instrument panel chute including a connection member and at least one hook aperture. The method may farther include providing a passenger airbag module with a first hook bracket engaged to the connection member and a removable second hook bracket having a hook end and a connection end, with the hook end of the second hook bracket engaged to the hook aperture and the connection end removably connected to the passenger airbag module by engagement of a detent or an aperture provided on the passenger airbag module with a complementary aperture or detent provided on the second hook bracket. The method may also include disengaging the connection end of the second hook bracket from the passenger airbag module by removing the detent or aperture provided on the passenger airbag module from the complementary aperture or detent provided on the second hook bracket.

For the method described above, the method may further include disengaging the hook end of the second hook bracket from the hook aperture. The method may also include disengaging the first hook bracket from the connection member. The hook end of either hook bracket may include a plurality of hooks for engaging hook apertures provided in the instrument panel chute.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENT

Figure 1:
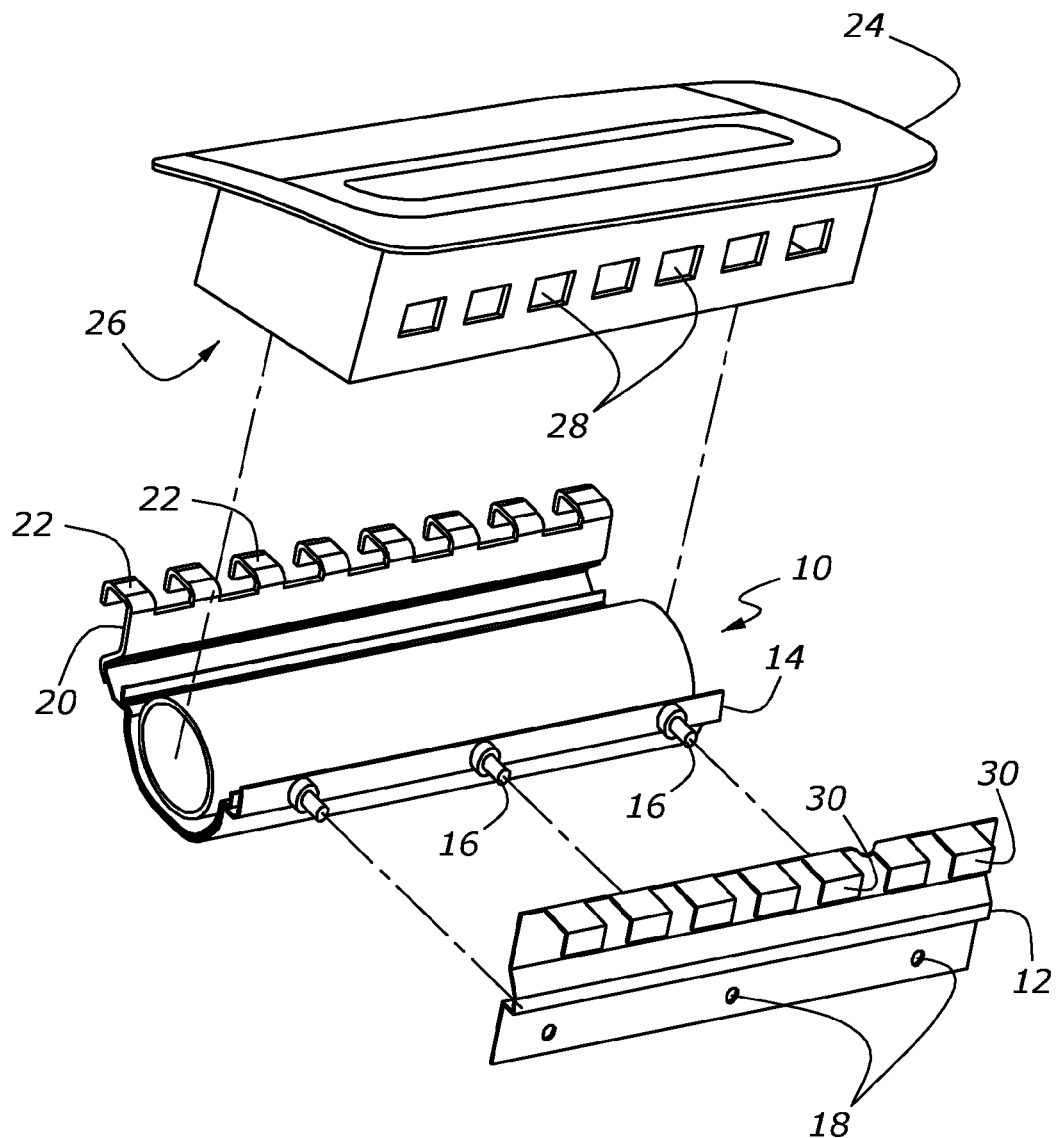
FIG. 1 is an illustrative view of an instrument panel chute, a PAB module and a removable hook bracket according to the present invention.

Turning now to the drawings wherein like reference characters refer to like and corresponding parts throughout the several views, FIG. 1-6 illustrate a method and apparatus for attachment and detachment of a PAB module, generally designated "PAB module 10."

Figure 2:
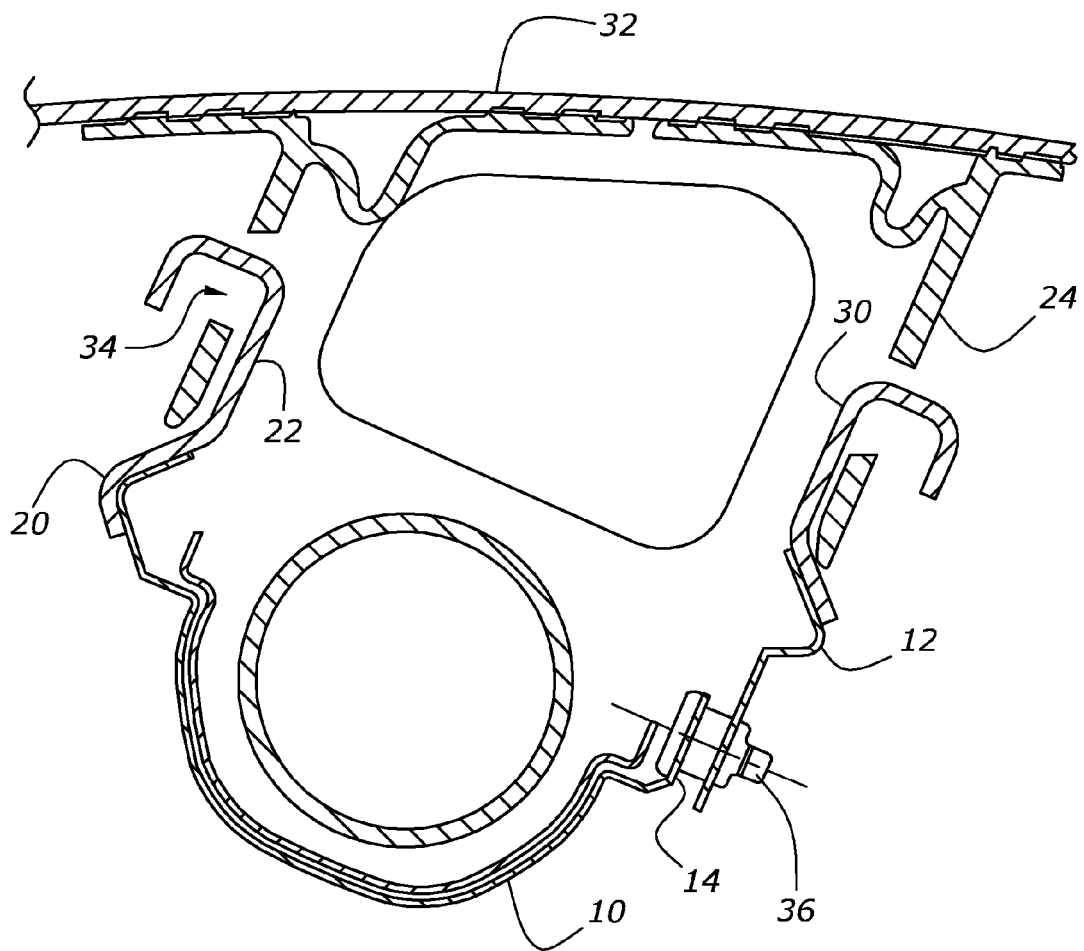
FIG. 2 is a cross-sectional view illustrative of a PAB module and a removable hook bracket in an engaged configuration.
Figure 3:
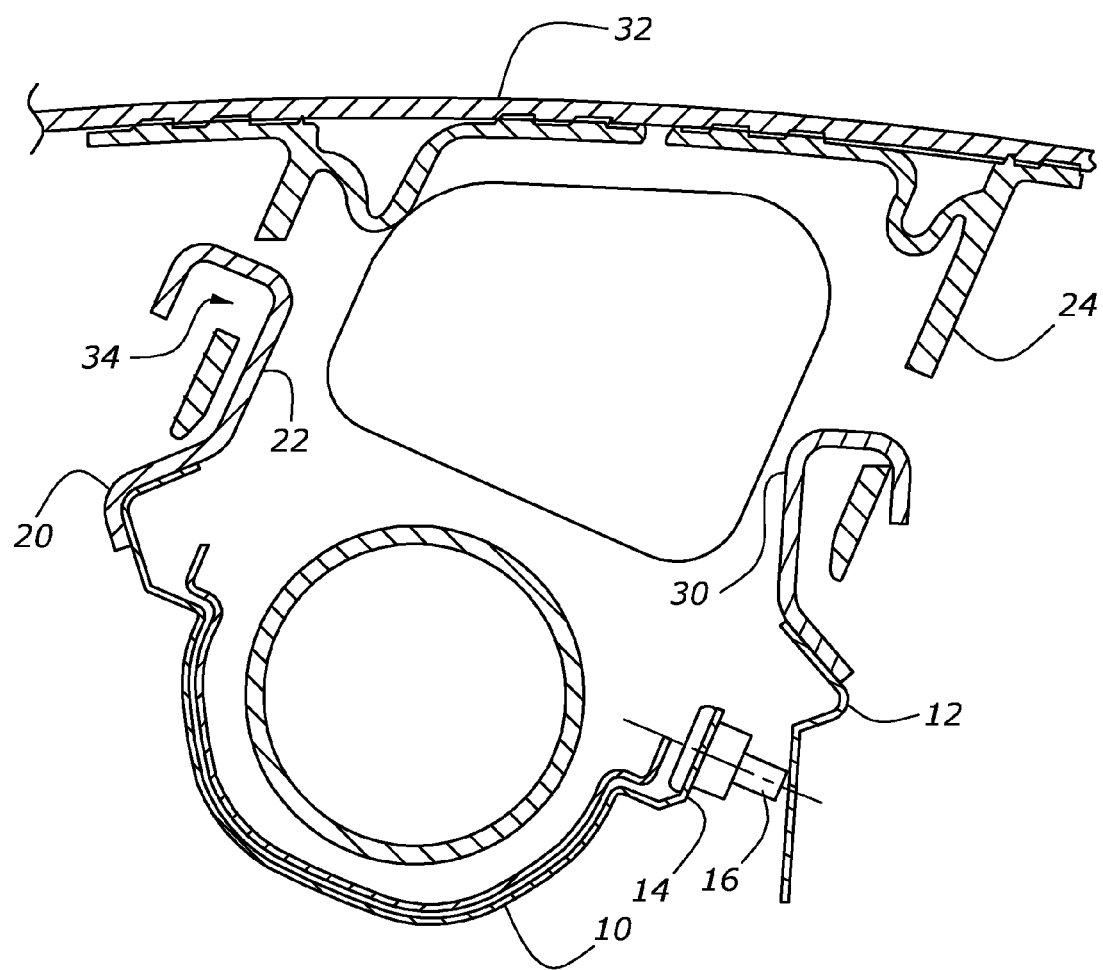
FIGS. 3-5 are cross-sectional views illustrative of a PAB module and disengagement of the removable hook bracket.
Figure 4:
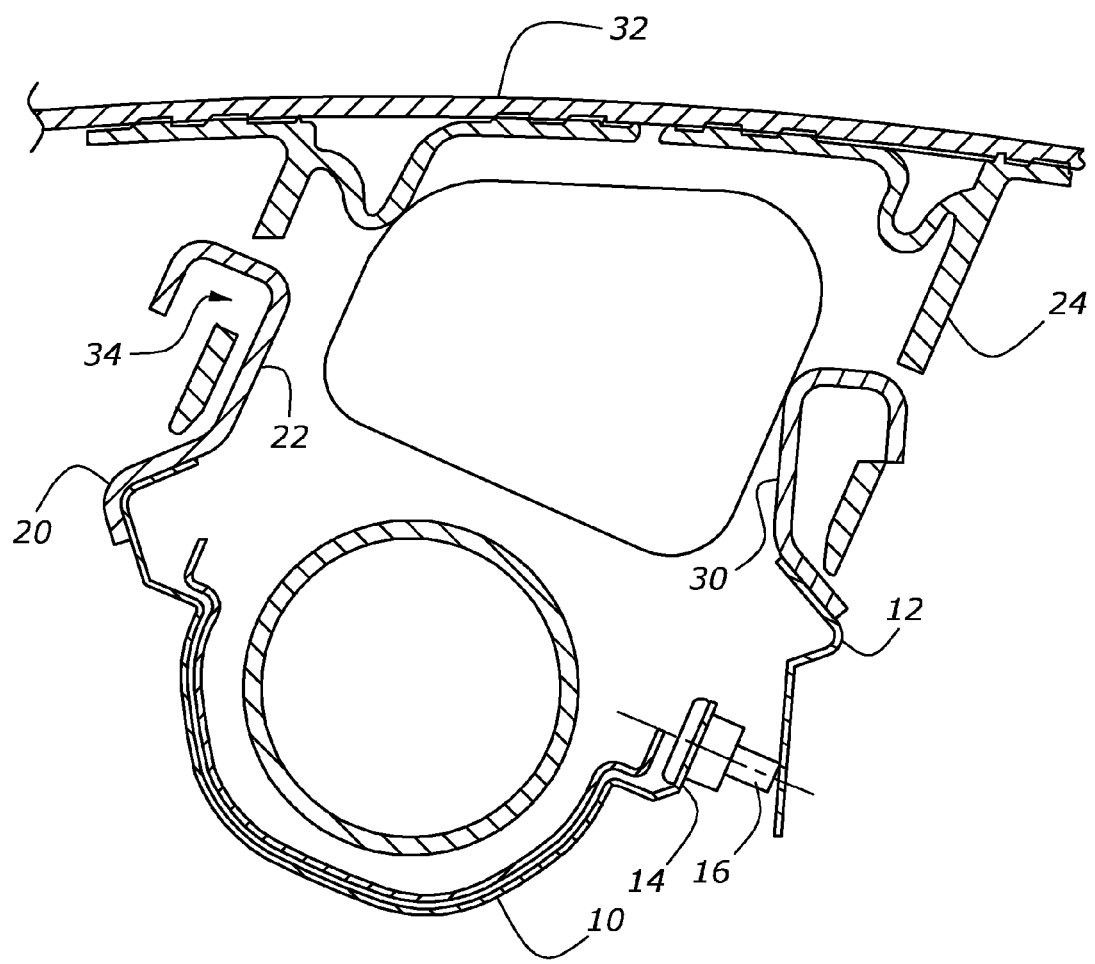
Figure 5:
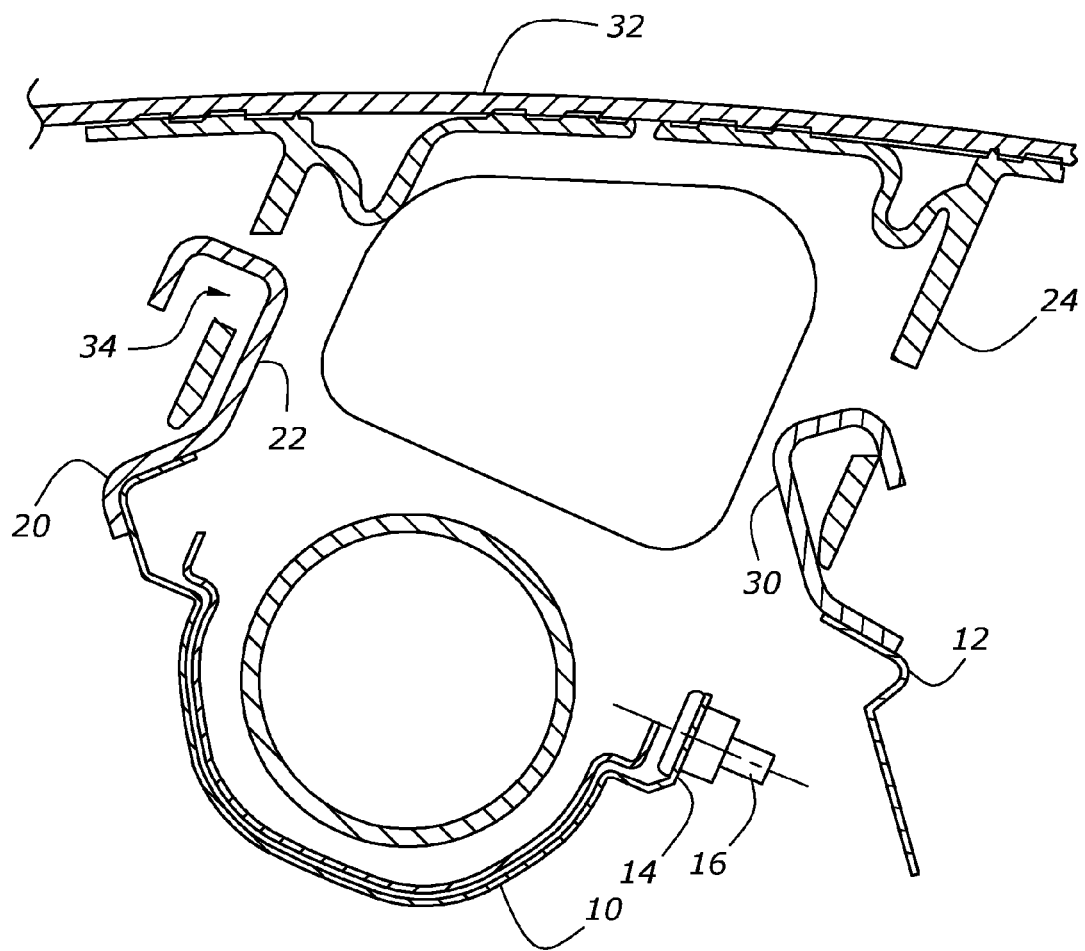

Referring to FIG. 1, the present invention provides PAB module 10 including a removable rear bracket 12, which may include a hook configuration, and rear connector 14 having detents 16 insertable into complementary apertures 18 provided in rear bracket 12. PAB module 10 may further include a front bracket 20 including hooks 22 for complementary engagement with an instrument panel chute 24, with front bracket 20 being fixedly mounted to or formed with PAB module 10. Instrument panel chute 24 may include an opening 26 for insertion of PAB module 10 and hook openings 28 for insertion and engagement of hooks 30 provided on rear bracket 12. As shown in FIG. 2, instrument panel chute 24 may be installed on the underside of an instrument panel 32 in a known manner, such as by vibration welding and the like.

Figure 6:
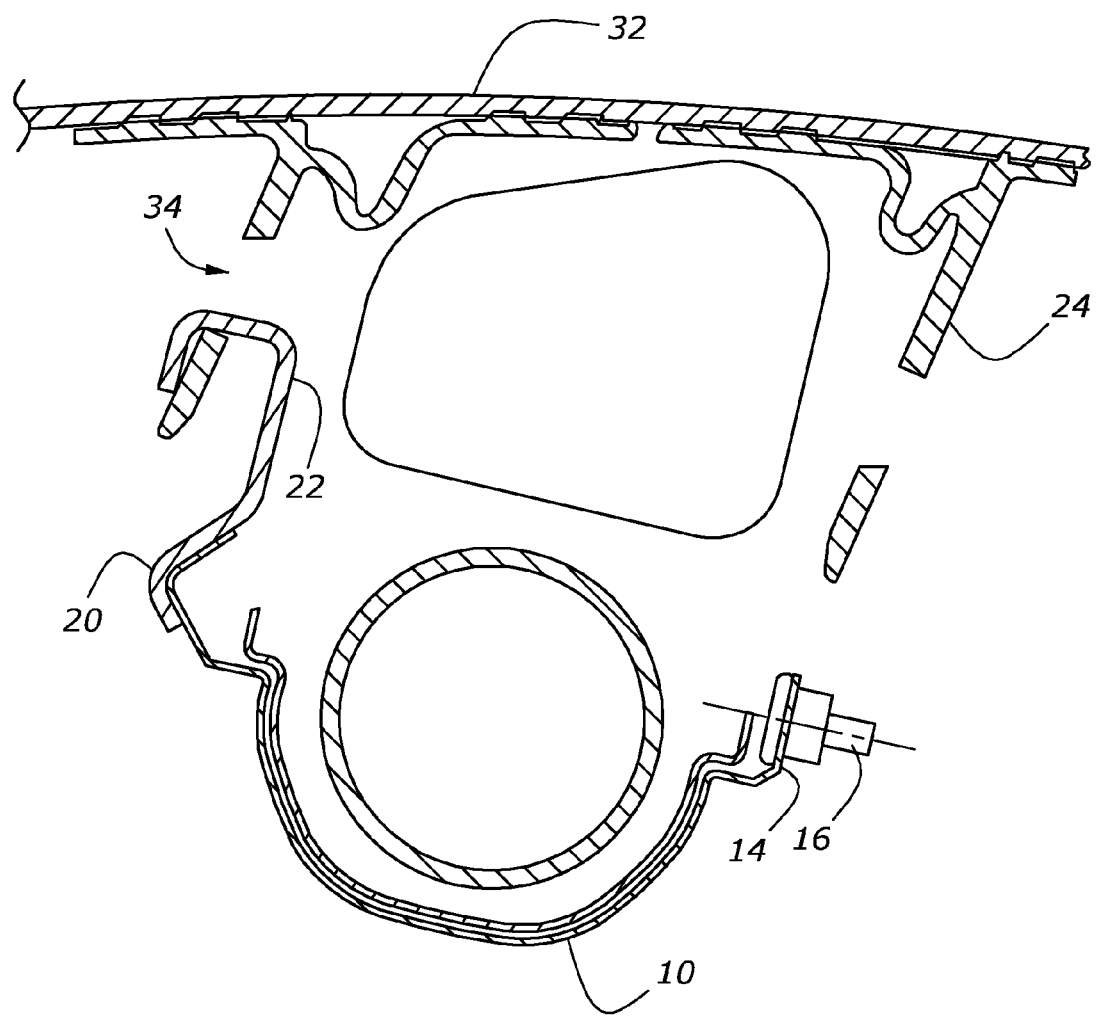
FIG. 6 is a cross-sectional view illustrative of a PAB module in a disengaged configuration.

Referring to FIG. 1, and in order from FIGS. 6-2, in order to install PAB module 10 to instrument panel chute 24, hooks 22 of front bracket 20 may be attached to complementary chute openings 34. Thereafter, hooks 30 may be inserted in complementary hook openings 28 of instrument panel chute 24, and detents 16 may be inserted into complementary apertures 18 provided in rear bracket 12. A fastener 36 or another similar device (i.e. a bolt if detent 16 includes threads, or a similar fastener capable of removably connecting two components) may be removably attached to each of the detents 16 for fixedly attaching rear bracket 12 to instrument panel chute 24.

In order to remove PAB module 10 from instrument panel chute 24, referring to FIG. 1, and in order from FIGS. 2-6, fasteners 36 may be removed from each of the detents 16, whereby detents 16 may be removed from apertures 18 of rear bracket 12. Once removed, as shown in order from FIGS. 3-6, rear bracket 12 may be removed from PAB module 10. During the removal process of PAB module 10, with rear bracket 12 removed, front bracket 20 may be removed from complementary chute openings 34 to allow complete removal of PAB module 10 from instrument panel chute 24.

With PAB module serviced (i.e. repaired or replaced) as needed, the aforementioned steps discussed with reference to FIGS. 2-6 (i.e. in order from FIGS. 6-2) may be used for re-attachment of PAB module 10 to instrument panel chute 24.

To summarize, the present invention thus provides an economical and efficient method and system for attaching and detaching PAB module 10, without causing unnecessary damage to instrument panel 32. In this regard, a user may remove PAB module 10 by removal of rear bracket 12 as discussed above, without the need for a prying device for expanding the instrument panel opening for allowing brackets 12, 20 to clear and be removed. The present invention method and system for attaching and detaching PAB module 10 also requires a minimal number of steps in that compared to the PAB module of U.S. Pat. No. 6,161,862 to Rose (as discussed above), for the present invention, bracket 12 may be readily removed by removal of fasteners 36 from each of the detents 16, whereby detents 16 may be removed from apertures 18 of rear bracket 12.

Those skilled in the art would readily appreciate in view of this disclosure that various modifications could be made to the aforementioned components, without departing from the scope of the present invention. For example, whereas brackets 12, 20 have been shown as including hooks 22, 30, other attachment methods known in the art may be readily used in lieu of or in conjunction with hooks 22, 30. Further, whereas the present invention has been described with reference to PAB module 10, bracket 12 may be readily used with other side/driver airbag modules. Likewise, whereas bracket 12 has been illustrated as being engageable with rear connector 14 by means of detents 16 insertable into apertures 18, other methods may be readily employed for attachment and alignment of bracket 12 to rear connector 14.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A passenger airbag module removably connectable to an automotive interior component, said passenger airbag module comprising:

a front bracket engageable with an automotive interior component and a rear connector having a detent or an aperture; and a rear bracket removably connectable with said rear connector and including an aperture or detent for respectively receiving or insertion into said detent or aperture of said rear connector by movement of said rear bracket in a direction generally transverse to a passenger airbag module longitudinal axis, said rear bracket being further configured to engage the automotive interior component.

2. A passenger airbag module according to claim 1, wherein said rear bracket includes at least one hook configured to engage the automotive interior component.

3. A passenger airbag module according to claim 2, wherein the automotive interior component is an airbag chute engaged with an instrument panel, and said hook is configured for insertion into a complementary opening in the airbag chute.

4. A passenger airbag module according to claim 1, further comprising a fastener connectable to said detent and configured to secure said rear bracket to said passenger airbag module.

5. A passenger airbag module according to claim 1, further comprising a connector engageable with said detent for securing said rear bracket to said passenger airbag module.

6. A passenger airbag module according to claim 1, wherein said front bracket includes at least one hook for engaging the automotive interior component.

7. A passenger airbag module removably connectable to an automotive instrument panel, said passenger airbag module comprising:

a first bracket engageable with an airbag chute connectable to the automotive instrument panel, and a connector having a detent or an aperture and disposed at a generally opposite side of said passenger airbag module as said first bracket; and a second bracket removably connectable with said connector and including an aperture or detent for respectively receiving or insertion into said detent or aperture of said connector by movement of said second bracket in a direction generally transverse to a passenger airbag module longitudinal axis, said second bracket being further configured to engage the airbag chute.

8. A passenger airbag module according to claim 7, wherein said second bracket includes at least one hook configured to engage the airbag chute.

9. A passenger airbag module according to claim 8, wherein said hook is configured for insertion into a complementary opening in the airbag chute.

10. A passenger airbag module according to claim 7, further comprising a fastener connectable to said detent and configured to secure said second bracket to said passenger airbag module.

11. A passenger airbag module according to claim 7, further comprising a connector engageable with said detent for securing said second bracket to said passenger airbag module.

12. A passenger airbag module according to claim 7, wherein said first bracket includes at least one hook for engaging the airbag chute.

* * * * *